US011612007B2

(12) United States Patent
Liu et al.

(10) Patent No.: US 11,612,007 B2
(45) Date of Patent: Mar. 21, 2023

(54) LOW POWER DISSIPATION BLUETOOTH MESH NETWORK SYSTEM AND COMMUNICATION METHOD

(71) Applicant: REALTEK SEMICONDUCTOR CORPORATION, Hsinchu (TW)

(72) Inventors: Yong Liu, Suzhou (CN); Yang Huang, Suzhou (CN); Yi-Fan Zhang, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 85 days.

(21) Appl. No.: 17/193,355

(22) Filed: Mar. 5, 2021

(65) Prior Publication Data
US 2021/0289570 A1    Sep. 16, 2021

(30) Foreign Application Priority Data

Mar. 16, 2020    (CN) .......................... 202010183769.7

(51) Int. Cl.
*H04W 76/14*    (2018.01)
*H04W 52/02*    (2009.01)
*H04W 4/80*    (2018.01)
*H04W 84/18*    (2009.01)

(52) U.S. Cl.
CPC ............. *H04W 76/14* (2018.02); *H04W 4/80* (2018.02); *H04W 52/0274* (2013.01); *H04W 84/18* (2013.01)

(58) Field of Classification Search
CPC ........ H04L 29/06; H04L 9/40; H04L 63/0272; H04L 63/029; G06F 16/955; H04W 84/18; H04W 4/80
See application file for complete search history.

(56) References Cited

U.S. PATENT DOCUMENTS

| | | | |
|---|---|---|---|
| 2020/0068656 A1 | 2/2020 | Yang et al. | |
| 2020/0389469 A1* | 12/2020 | Litichever | H04L 63/029 |
| 2021/0022207 A1* | 1/2021 | Hans | H04W 40/02 |
| 2021/0037387 A1* | 2/2021 | Kharvar | H04L 9/3242 |

OTHER PUBLICATIONS

OA letter of the counterpart TW application (appl. No. 109112015) mailed on Dec. 2, 2020. Summary of the OA letter: Claims 1~10 are rejected as being unpatentable over the disclosure of the cited reference 1 (US2020/0068656A1).

* cited by examiner

Primary Examiner — Iqbal Zaidi
(74) Attorney, Agent, or Firm — WPAT, PC

(57) ABSTRACT

The present invention discloses a low power dissipation Bluetooth mesh network system and a communication method thereof. The Bluetooth mesh network system includes a friend node and a lower power node. The friend node operates as a proxy server terminal to perform a proxy server broadcast. The lower power node operates as a proxy client and establishes a connection with the friend node based on a proxy protocol when the proxy server broadcast is received and identified. The friend node further filters out an invalid packet unrelated to the low power node and stores a valid packet related to the low power node so as to transmit the valid packet to the low power node when the low power node switches from a sleep status to a wakeup status.

10 Claims, 2 Drawing Sheets

LOW POWER DISSIPATION BLUETOOTH MESH NETWORK SYSTEM AND COMMUNICATION METHOD

BACKGROUND OF THE INVENTION

1. Field of the Invention

The present invention relates to a low power dissipation Bluetooth mesh network system and a communication method thereof.

2. Description of Related Art

Along with the quick development of Internet of Things (IoT) technology in recent years, the applications of smart home, smart building and smart factory increase in a great deal. The technology of Bluetooth, which is a lower power dissipation technology, becomes more and more important. The standard organization of Bluetooth, i.e. Bluetooth Special Interest Group (Bluetooth SIG), intends to implement many-to-many communication by introducing Bluetooth mesh network technology, to provide communications with longer transmission distance. Such technology is considered to expand the IoT market.

In Bluetooth mesh network technology, a low power node has to maintain low power dissipation for a long time, since the low power node normally does not have stable power supplied thereto. However, the low power node performs communication by using broadcasting and scanning. As a result, the low power node receives all the packets in the network no matter these packets are related to the low power node or not. Such a communication method increases necessary power dissipation and is not able to save power.

SUMMARY OF THE INVENTION

In consideration of the problem of the prior art, an object of the present invention is to provide a low power dissipation Bluetooth mesh network system and a communication method thereof.

The present invention discloses a low power dissipation Bluetooth mesh network system that includes at least one friend node and at least one low power node. The friend node is configured to operate as a proxy server terminal to perform a proxy server broadcast. The low power node is configured to operate as a proxy client terminal to establish a connection with the friend node based on a proxy protocol when the low power node receives and identifies the proxy server broadcast. After the connection is established based on the proxy protocol, the friend node is further configured to filter out at least one invalid packet unrelated to the low power node, and store at least one valid packet related to the low power node, so as to transmit the valid packet to the low power node when the low power node switches from a sleep status to a wakeup status.

The present invention also discloses a low power dissipation Bluetooth mesh network system communication method used in a Bluetooth mesh network system that includes the steps outlined below. At least one friend node is operated as a proxy server terminal to perform a proxy server broadcast. At least one low power node is operated as a proxy client terminal to establish a connection with the friend node based on a proxy protocol when the low power node receives and identifies the proxy server broadcast. After the connection is established based on the proxy protocol, at least one invalid packet unrelated to the low power node is filtered out, and at least one valid packet related to the low power node is stored by the friend node. The valid packet is transmitted to the low power node by the friend node when the low power node switches from a sleep status to a wakeup status.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a low power dissipation Bluetooth mesh network system and a communication method thereof to establish a one-to-one connection between a friend node and a low power node such that the friend node Filters unrelated packets for the low power node, to greatly reduce the power dissipation of the low power node.

Figure 1:
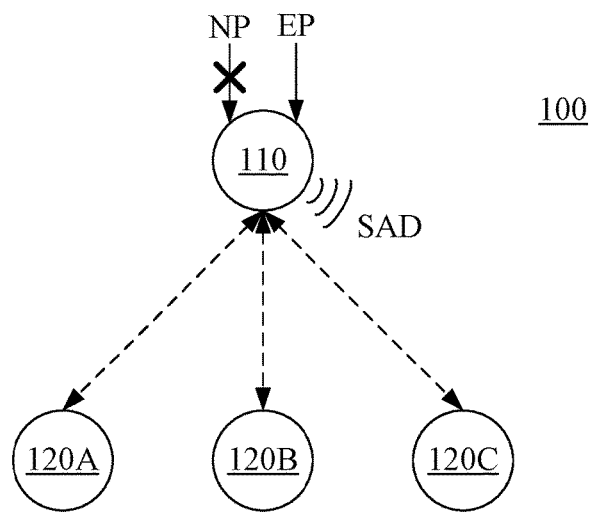
FIG. 1 illustrates a diagram of a low power dissipation Bluetooth mesh network system according to an embodiment of the present invention.

Reference is now made to FIG. 1. FIG. 1 illustrates a diagram of a low power dissipation Bluetooth mesh network system 100 according to an embodiment of the present invention. The Bluetooth mesh network system 100 includes a friend node 110 and low power nodes 120A~120C. The friend node 110 and the low power nodes 120A~120C performs communication under the protocol of Bluetooth mesh network.

In an embodiment, the friend node 110 operates according to a power from a stable power source. The friend node 110 can thus be kept in a wakeup status. On the contrary, each of the low power nodes 120A~120C operates according to a power from an unstable power source, e.g. battery. Each of the low power nodes 120A~120C thus has to be kept in a sleep status for a long time. Each of the low power nodes 120A~120C only switches to the wakeup status for a fairly short time period only when necessary, and switches back to the sleep status soon to maintain low power dissipation. In an embodiment, the low power nodes 120A~120C may switch from the sleep status to the wakeup status periodically based on a predetermined time period.

In an embodiment, the friend node 110 can establish a one-to-one connection with each of the low power nodes 120A~120C through a generic attribute protocol bearer (GATT bearer) based on a specific proxy protocol. In an embodiment, the proxy protocol can be such as, but not limited to a network proxy protocol.

The friend node 110 is configured to operate as a proxy server terminal under the proxy protocol described above, to perform a periodic proxy server broadcast SAD. The packet of the proxy server broadcast SAD includes information that informs other nodes that the friend node 110 is able to serve as the proxy server terminal.

Each of the low power nodes 120A~120C is configured to operate as a proxy client terminal under the proxy protocol described above, to establish a connection with the friend node 110 based on the proxy protocol when any one of the low power nodes 120A~120C receives and identifies the proxy server broadcast SAD. In an embodiment, after each of the low power nodes 120A~120C establishes the connection with the friend node 110, each of the low power nodes 120A~120C adds a network address thereof to a connection list (not illustrated) of the friend node 110.

In an embodiment, the friend node 110 supports a relay node function. More specifically, the friend node 110 has the ability to store and transfer packets. As a result, after the friend node 110 establishes the connection with the low power nodes 120A~120C based on the proxy protocol, the friend node 110 is configured to filter out at least one invalid packet NP unrelated to the low power nodes 120A~120C, and store at least one valid packet EP related to the low power nodes 120A~120C. Moreover, the friend node 110 transmits the valid packet EP to the low power nodes 120A~120C when the low power nodes 120A~120C switches from the sleep status to the wakeup status.

In some approaches, the low power nodes 120A~120C and the friend node 110 perform many-to-one communication through an advertising bearer, by using broadcasting and scanning Under such a communication method, by using the scanning technology, the low power nodes 120A~120C receives all the packets that are either related or unrelated to the low power nodes 120A~120C under the wakeup status. Therefore, even the packets are unrelated to the low power nodes 120A~120C, the low power nodes 120A~120C still have to spend additional time to perform processing, and thus dissipate unnecessary power.

The low power dissipation Bluetooth mesh network system of the present invention can establish a one-to-one connection between the friend node and the low power nodes such that the friend node filters unrelated packets and keeps only the packets related to the low power nodes. The friend node only transmits the related packets to the low power nodes under the wakeup status of the low power nodes. The processing time of the low power nodes can be reduced, to further accomplish low power dissipation.

It is appreciated that the number of the friend node and the low power nodes in the Bluetooth mesh network system described above is merely an example. In other embodiments, the number of the friend node and the low power nodes can be any number that is one or larger than one.

Figure 2A:
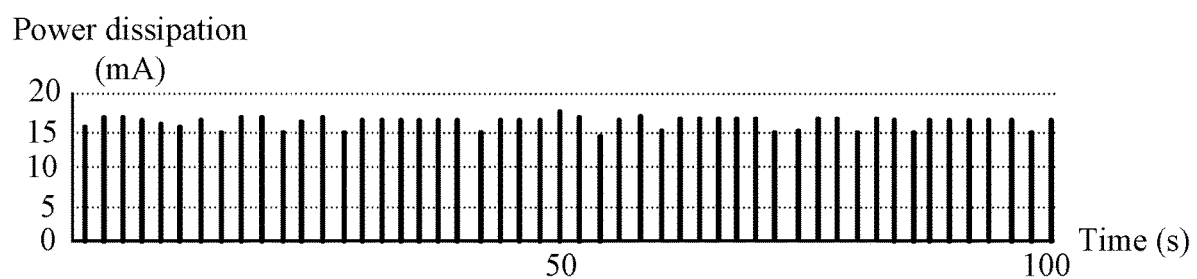
FIG. 2A illustrates a diagram of power dissipation of the low power nodes when the communication with the friend node is performed by using broadcasting and scanning according to an embodiment of the present invention.
Figure 2B:
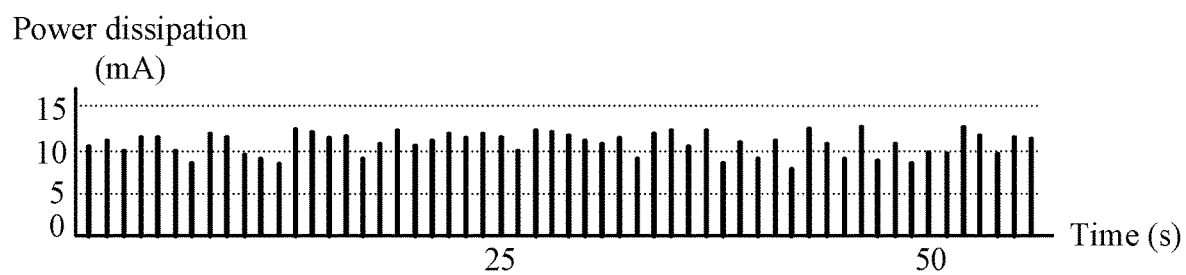
FIG. 2B illustrates a diagram of power dissipation of the low power nodes when the communication with the friend node is performed by using one-to-one connection according to an embodiment of the present invention.

Reference is now made to FIG. 2A and FIG. 2B. FIG. 2A illustrates a diagram of power dissipation of the low power nodes 120A~120C when the communication with the friend node 110 is performed by using broadcasting and scanning according to an embodiment of the present invention. FIG. 2B illustrates a diagram of power dissipation of the low power nodes 120A~120C when the communication with the friend node 110 is performed by using one-to-one connection according to an embodiment of the present invention. The X-axis and the Y-axis in FIG. 2A and FIG. 2B respectively stand for time and power dissipation. The units thereof are respectively second (S) and milliampere (mA).

In FIG. 2A, a usage scenario that performs polling once every 2 seconds within a time period of 100 seconds is illustrated. In FIG. 2B, a usage scenario that performs polling once every 1 second within a time period of 50 seconds is illustrated.

As illustrated, for the communication performed among the low power nodes 120A~120C and the friend node 110, when one-to-one connection of the present invention is used, the peak value of the power dissipation is around 10 mA, which is lower than the peak value of 15 mA when broadcasting and scanning is used. The average power dissipation under the standby status when one-to-one connection of the present invention is used is only 12 µA. Even under the status that the data is being transmitted, the average power dissipation is only 24 µA. Both the values are much lower than the average power dissipation of 120 µA under the standby status when broadcasting and scanning is used.

Figure 3:
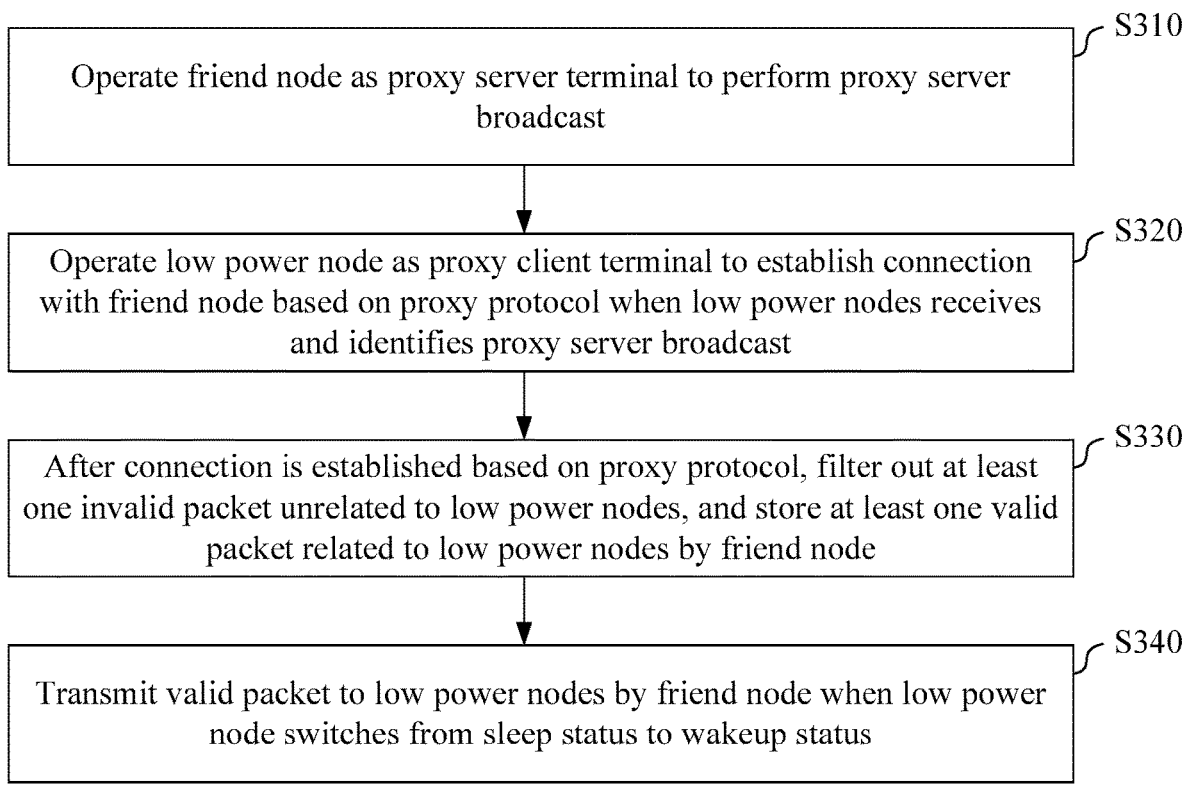
FIG. 3 illustrates a flow chart of a Bluetooth mesh network system communication method according to an embodiment of the present invention.

Reference is now made to FIG. 3. FIG. 3 illustrates a flow chart of a Bluetooth mesh network system communication method 300 according to an embodiment of the present invention.

Besides the apparatus described above, the present invention further discloses the Bluetooth mesh network system communication method 300 that can be used in such as, but not limited to the Bluetooth mesh network system 100 illustrated in FIG. 1. An embodiment of the Bluetooth mesh network system communication method 300 is illustrated in FIG. 3 and includes the steps outlined below.

In step S310, the friend node 110 is operated as the proxy server terminal to perform the proxy server broadcast SAD.

In step S320, each of the low power nodes 120A~120C is operated as the proxy client terminal to establish the connection with the friend node 110 based on the proxy protocol when each of the low power nodes 120A~120C receives and identifies the proxy server broadcast SAD.

In step S330, after the connection is established based on the proxy protocol, at least one invalid packet NP unrelated to the low power nodes 120A~120C is filtered out, and at least one valid packet EP related to the low power nodes 120A~120C is stored by the friend node 110.

In step S340, the valid packet EP is transmitted to the low power nodes 120A~120C by the friend node 110 when the low power nodes 120A~120C switches from the sleep status to the wakeup status.

It is appreciated that the embodiments described above are merely an example. In other embodiments, it should be appreciated that many modifications and changes may be made by those of ordinary skill in the art without departing from the spirit of the invention.

In summary, the Bluetooth mesh network system and the communication method of the present invention can filter out unrelated packets by the friend node for the low power node such that only the related packets are transmitted by the friend node to the low power node. The power dissipation of the low power node can be greatly reduced.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:
1. A low power dissipation Bluetooth mesh network system, comprising:
    at least one friend node configured to operate as a proxy server terminal to perform a proxy server broadcast; and at least one low power node configured to receive and identify the proxy server broadcast to operate as a proxy client terminal to establish a connection with the friend node based on a proxy protocol, in which the friend node filters out at least one invalid packet unrelated to the low power node and stores at least one valid packet related to the low power node;

wherein the low power node switches from a sleep status to a wakeup status such that the friend node transmits the valid packet to the low power node.

2. The Bluetooth mesh network system of claim 1, wherein the friend node and the low power node establishes a one-to-one connection through a generic attribute protocol bearer (GATT bearer) based on the proxy protocol.

3. The Bluetooth mesh network system of claim 1, wherein the proxy protocol is a network proxy protocol.

4. The Bluetooth mesh network system of claim 1, wherein the friend node supports a relay node function.

5. The Bluetooth mesh network system of claim 1, wherein the low power node establishes the connection with the friend node to add a network address of the low power node to a connection list of the friend node.

6. A low power dissipation Bluetooth mesh network system communication method used in a Bluetooth mesh network system, the method comprising:

operating at least one friend node as a proxy server terminal to perform a proxy server broadcast;

receiving and identifying the proxy server broadcast by at least one low power node to operate the low power node as a proxy client terminal to establish a connection with the friend node based on a proxy protocol, in which the friend node filters out at least one invalid packet unrelated to the low power node and stores at least one valid packet related to the low power node; and switching the low power node from a sleep status to a wakeup status such that the friend node transmits the valid packet to the low power node.

7. The Bluetooth mesh network system communication method of claim 6, wherein the friend node and the low power node establishes a one-to-one connection through a generic attribute protocol bearer (GATT bearer) based on the proxy protocol.

8. The Bluetooth mesh network system communication method of claim 6, wherein the proxy protocol is a network proxy protocol.

9. The Bluetooth mesh network system communication method of claim 6, wherein the friend node supports a relay node function.

10. The Bluetooth mesh network system communication method of claim 6, further comprising:

establishing the connection with the friend node to add a network address of the low power node to a connection list of the friend node by the low power node.

\* \* \* \* \*